United States Patent [19]

Kojima et al.

[11] Patent Number: 4,984,927

[45] Date of Patent: Jan. 15, 1991

[54] CERAMIC AND METAL JOINING STRUCTURE

[75] Inventors: Takio Kojima; Masaya Ito, both of Nagoya, Japan

[73] Assignee: NGK Spark Plug Co., Ltd., Nagoya, Japan

[21] Appl. No.: 312,383

[22] Filed: Feb. 17, 1989

Related U.S. Application Data

[63] Continuation of Ser. No. 908,205, Sep. 17, 1986, abandoned.

[30] Foreign Application Priority Data

Sep. 30, 1985 [JP] Japan .......... 60-219580

[51] Int. Cl.[5] .......... F16B 9/00; F01D 5/28

[52] U.S. Cl. .......... 403/30; 403/272; 403/273; 403/404; 416/241 B; 416/244 A

[58] Field of Search .......... 403/30, 29, 28, 376, 403/380, 345, 272, 270, 273, 404, 179; 416/241 B, 244 A

[56] References Cited

U.S. PATENT DOCUMENTS

| | | | |
|---|---|---|---|
| 3,666,302 | 5/1972 | Kellet | 403/28 |
| 4,325,647 | 4/1982 | Maier et al. | 403/29 |
| 4,424,003 | 1/1984 | Brobeck | 416/244 A |
| 4,486,147 | 12/1984 | Byrne et al. | 416/241 B |
| 4,557,704 | 12/1985 | Ho et al. | 416/241 B |
| 4,585,396 | 4/1986 | Kawamura et al. | 416/241 B |
| 4,659,245 | 4/1987 | Hirao et al. | 403/30 |
| 4,747,722 | 5/1988 | Kawaguchi et al. | 403/30 |
| 4,784,574 | 11/1988 | Tsuno et al. | 403/30 X |

FOREIGN PATENT DOCUMENTS

| | | | |
|---|---|---|---|
| 3521058 | 12/1985 | Fed. Rep. of Germany | 416/241 B |
| 5793606 | 6/1982 | Japan | 416/241 B |

*Primary Examiner*—Peter M. Cuomo

*Attorney, Agent, or Firm*—Foley, Lardner, Schwartz, Jeffery, Schwaab, Mack, Blumenthal & Evans

[57] ABSTRACT

Ceramic and metal shafts are joined at their ends by brazing, with a buffer member being interposed therebetween. The joined ends of the ceramic and metal shafts and the buffer member are received within a metal sleeve and joined by brazing to part of the inner circumferential wall of the metal sleeve in such a manner than an axial end of the joint where the inner circumferential wall is securely joined to the ceramic and metal shafts is positioned between opposite axial ends of the metal sleeve and at the same time between opposite axial ends of the ceramic shaft. The outer circumferential wall of the metal sleeve is formed with an annular groove in the place corresponding to the above mentioned axial end of the joint with respect to the axial direction of the metal sleeve.

18 Claims, 5 Drawing Sheets

16
4b
17
4a
14
7
11a
8
5
3
12
11

CERAMIC AND METAL JOINING STRUCTURE

This application is a continuation of application Ser. No. 908,205, filed Sept. 17, 1986, now abandoned.

BACKGROUND OF THE INVENTION

1. Field of the Invention

The present invention relates to a ceramic and metal joining structure, as a structure for joining a metal shaft to a ceramic turbine wheel of a turbocharger by the use of a metal sleeve.

2. Description of the Prior Art

Ceramic materials have a very high hot hardness but are deficient in strength such as fracture toughness. For this reason, in case, for example, where a turbine wheel of a turbocharger for an internal combustion engine is made of ceramic, it needs to be joined with a metal shaft. An example of this kind of ceramic and metal joining structure is shown in FIG. 9. In the joining structure, a ceramic shaft 101 integral with a ceramic turbine wheel is joined at its end with a corresponding end of a metal shaft 102 by interposing therebetween a buffer member 103, while being received within a metal sleeve 104 together with the metal shaft 102 at their matched ends. The metal sleeve 104 is attached to the ceramic shaft 101 and the metal shaft 102 by brazing or shrink fit.

A disadvantage of the foregoing joining structure is that the ceramic shaft 101 is liable to fracture in the place adjacent a joint end 101*a* and therefore poor in durability as well as unreliable in operation. This is because high stress concentration is liable to occur in the ceramic shaft 101 in the place adjacent the joint end 101*a* due to the fact that stresses are produced in the ceramic shaft 101 by a compressive force applied thereto from the brazing metal or the shrink-fitted metal sleeve 104 and to the fact that thermal stresses are liable to be produced in the ceramic shaft 101 in the place adjacent the joint end 101*a* since the joint end 101*a* is exposed to high temperature gases when in use.

SUMMARY OF THE INVENTION

In accordance with the present invention, there is provided a novel and improved ceramic and metal joining structure which comprises a ceramic shaft, a metal sleeve installed on the ceramic shaft and having inner and outer circumferential walls, and means for securely joining part of the inner circumferential wall of the metal sleeve to the ceramic shaft in such a manner that an axial end of the joint where the inner circumferential wall of the metal sleeve is securedly joined to the ceramic shaft is positioned between opposite axial ends of the metal sleeve and at the same time between opposite axial ends of the ceramic shaft, in which the outer circumferential wall of the metal sleeve is formed with an annular groove in the place corresponding to the axial end of the joint with respect to the axial direction of the metal sleeve.

The above structure is quite effective for overcoming the above noted disadvantages and shortcoming inherent in the prior art structures.

It is accordingly an object of the present invention to provide a novel and improved ceramic and metal joining structure which is excellent in durability, particularly durable in repeated heating, and highly reliable in operation.

It is another object of the present invention to provide a novel and improved ceramic and metal joining structure of the above described character which has an excellent heat resisting property.

It is a further object of the present invention to provide a novel and improved ceramic and metal joining structure of the above described character which can prevent or at least mitigate stress concentration in its ceramic shaft.

It is a still further object of the present invention to provide a novel and improved ceramic and metal joining structure of the above described character which can reduce thermal stresses to be produced in the ceramic shaft.

DETAILED DESCRIPTION OF THE PREFERRED EMBODIMENTS

Figure 3:
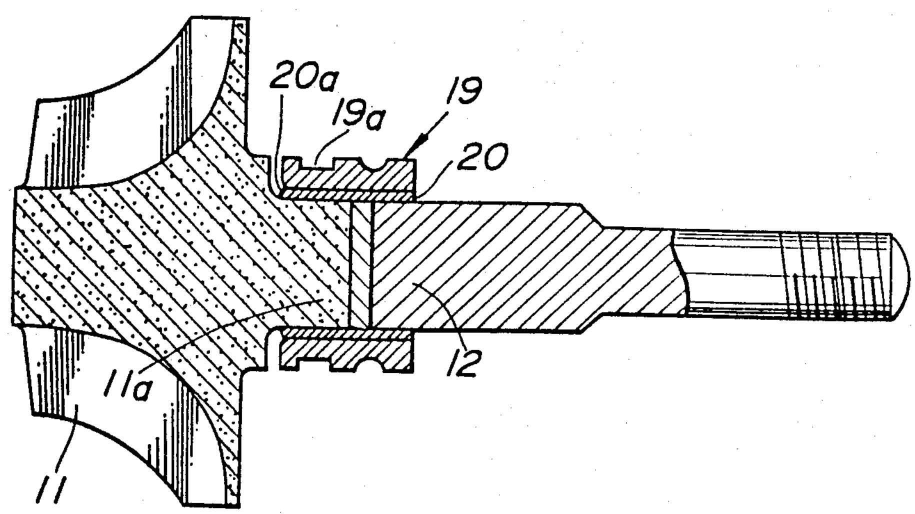
FIG. 3 is a view similar to FIG. 2A but showing a less preferred example for comparison with the embodiment of FIG. 2A.

Referring now to the drawings in which like reference numerals designate like parts throughout the several views thereof, there is shown in FIG. 3 a ceramic and metal joining structure according to an embodiment of the present invention. In this embodiment, a round ceramic shaft 1 of 10 mm in diameter and a metal shaft 2 of the same diameter as the ceramic shaft 1 are abuttingly joined by interposing therebetween a buffer member 3 and united together by brazing. More specifically, the ceramic shaft 1 is made of silicon nitride while the metal shaft 2 is made of martensitic stainless steel. The buffer member 3 is three-layered to have two Ni-layers and one W-Ni layer therebetween. The joined ends of the ceramic and metal shafts 1 and 2 are then inserted into a metal sleeve 4 of 15 mm in outer diameter and 10 mm in length. The metal sleeve 4 is made of stainless steel and formed with a stepped bore including a smaller diameter bore portion 4*a* of 10.2 mm in diameter and 7 mm in length and a larger diameter bore portion 4*b* of 11 mm in diameter. In this connection, the joined ends of the ceramic and metal shafts 1 and 2 are inserted into the metal sleeve 4 in such a manner that the buffer member 3 is placed axially in the middle of the first bore portion 4*a*. The metal sleeve 4 is united at the first bore portion 4*a* to the ceramic and metal shafts 1 and 2 by brazing with a brazing metal 5. The metal sleeve 4 is formed with an annular groove 6 in the outer periphery thereof. The annular groove 6 is semi-circular (1.5 mm in radius) in cross section and arranged in the position corresponding to an end 7 of the joint where the ceramic shaft 1 is securely joined with the metal sleeve 4, or in other words, in the place corresponding to a shoulder 8 between the smaller and larger bore portions *4a* and *4b* with respect to the axial direction of the metal sleeve 4. The following test will prove that the above embodiment of this invention is highly effective for preventing stress concentration and production of thermal stresses in the ceramic shaft 1.

(1) Stress Concentration Test

The length of the ceramic shaft 1 is 50 mm, and the stress concentration test is made in such a manner that a load is applied upon the free end of the ceramic shaft 1 at right angles, with the metal sleeve 4 being held fixedly in the place adjacent the joined end of the ceramic shaft 1. The result of the test is shown in Table (1) in which an example for comparison differs from the embodiment of this invention in that it is not formed with the groove 6.

TABLE (1)

| | Bending strength |
|---|---|
| Invention | about 100 Kg |
| Example for comparison | about 70 Kg |

(2) Thermal Stress Test

The length of the ceramic shaft 1 is 50 mm, and the thermal stress test is made by cyclically heating and cooling test articles in such a manner that on the condition that the free end of the metal shaft 2 is cooled down to 50° C., the free end of the ceramic shaft 1 is first heated for one minute in the flame or gases of 900° C. and then cooled down to 100° C. The result of the test is shown in Table (2) in which an example for comparison differs from the embodiment of this invention in that it is not formed with the groove 6.

TABLE (2)

| | Heat Resisting Property |
|---|---|
| Invention | Nothing wrong or abnormal is produced in the ceramic shaft after 500 cycles of heating and cooling |
| Examples for Comparison | Cracks are produced in the ceramic shaft after 250 to 300 cycles of heating and cooling. |

From the foregoing, it is to be understood that the ceramic and metal joining structure of this invention is effective for preventing or mitigating production of thermal stresses and stress concentration in the ceramic shaft 1. This is partly because the metal sleeve 4 is provided with a sleeve portion *4c* out of contact from the ceramic shaft 1, which sleeve portion *4c* maintains the temperature of the metal sleeve 4 below a desired value and thereby prevents production of thermal stresses since the sleeve portion *4c* is not directly heated by the ceramic shaft 1 and has a heat radiating function and partly because the groove 6 reduces the compressive force applied from the metal sleeve 4 to the portion of the ceramic shaft 1 adjacent the joint end 7.

Figure 2A:
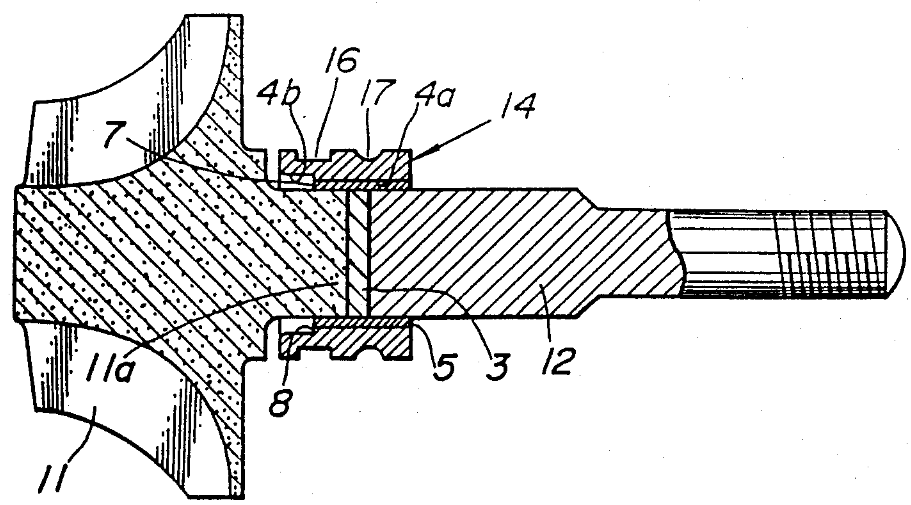
FIG. 2 is a longitudinal sectional view of another embodiment of the present invention which is applied to a turbine rotor of a turbocharger for use in an automotive vehicle engine.
FIG. 2B is an enlarged perspective view of a metal sleeve employed in the joining structure of FIG. 2A.
Figure 2B:
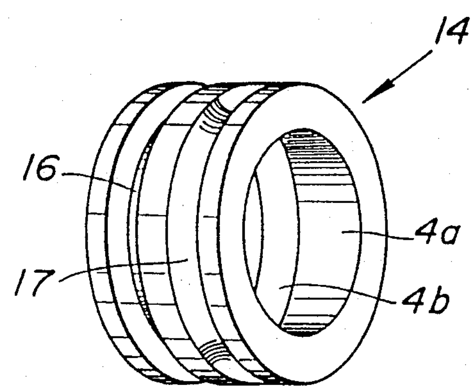

FIGS. 2A and 2B show a turbocharger rotor according to another embodiment of the present invention. This embodiment includes a ceramic shaft 11*a* integral with a ceramic turbine wheel 11, a metal shaft 12 adapted to install at the free end thereof a compressor wheel (not shown), and a metal sleeve 14 formed with an oil seal groove 16 for installation of a sealing member (not shown) and a slinger groove 17 for installation of a slinger or oil thrower (not shown). The oil seal groove 16 is rectangular in cross section and arranged in a position corresponding, with respect to the axial direction of the metal sleeve 14, to the axial end 7 of the joint where the ceramic shaft 11*a* is securely joined with the metal shaft 12. By this, the oil seal groove 16 is given an additional function similar to the groove 6 in the previous embodiment. The slinger groove 17 is semi-circular in cross section. Except for the above, the structure for joining the metal shaft 12 to the ceramic shaft 11*a* is substantially similar to the previous embodiment.

This embodiment is subjected to a stress concentration test similar to the previous embodiment and a thermal stress test. In the tests, this embodiment is compared with such an example that is shown in FIG. 3. The example for comparison differs from this embodiment in that a metal sleeve 19 is not provided with a stepped bore but an inner circumferential wall of a uniform cross section so that an axial end 20*a* of the joint where the metal sleeve 19 is securely joined with the ceramic and metal shafts 11*a* and 12 by brazing with a brazing metal 20 is not arranged in the position corresponding to an oil seal groove 19*a* with respect to the axial direction of the metal sleeve 19 and that the entire inner circumferential wall of the metal sleeve 19 is covered with the brazing metal 20 to serve for the joining. From the stress concentration test, it was found that the bending strength of this embodiment is 1.4 times as large as that of the example for comparison. From the thermal stress test, it was found that in the case of this embodiment which is installed in an internal combustion engine and put into use under the full-throttle condition while being subjected to heat of exhaust gases of 900° C., nothing wrong or abnormal is produced in the ceramic shaft 11*a* after the lapse of 500 hours of usage. In contrast to this, the example for comparison was broken after the lapse of 100 hours of usage under the same condition as this embodiment.

From the foregoing, it is to be understood that the ceramic and metal joining structure of this invention is effective for mitigating the stress concentration and the production of thermal stresses and can increase the durability.

Figure 4:
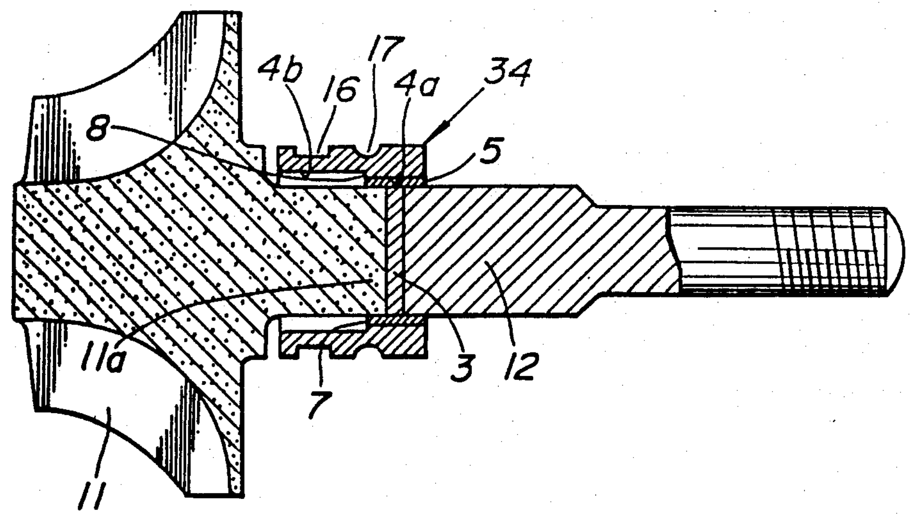
FIG. 4 is a view similar to FIG. 2A but showing a modification of the present invention.

FIG. 4 shows a further embodiment of the present invention. This embodiment differs from the previous embodiment of FIGS. 2A and 2B in that the smaller diameter bore portion *4a* is formed to be shorter in axial length than the larger diameter bore portion *4b* so that the shoulder 8 is arranged in the position corresponding not to the oil seal groove 16 but to the slinger groove 17. By this, when the metal sleeve 34 is joined at the smaller diameter bore portion *4a* with the ceramic and metal shafts 11*a* and 12, the end 7 of the joint where the metal sleeve 34 is securely joined with the ceramic and metal shafts 11*a* and 12 by brazing with the brazing metal 5 is positioned so as to correspond to the slinger groove 17 with respect to the axial direction of the metal sleeve 34.

This embodiment was subjected to a stress concentration test and a thermal stress test substantially similar to the previous embodiment of FIGS. 2A and 2B. From the tests, it was found that the bending strength of this embodiment is 1.3 times as large as that of the example for comparison and nothing wrong or abnormal is produced in the ceramic shaft after the lapse of 500 hours of usage. It is therefore to be understood that the ceramic and metal joining structure according to this embodiment is effective for mitigating the stress concentration and the production of thermal stress.

Figure 1:
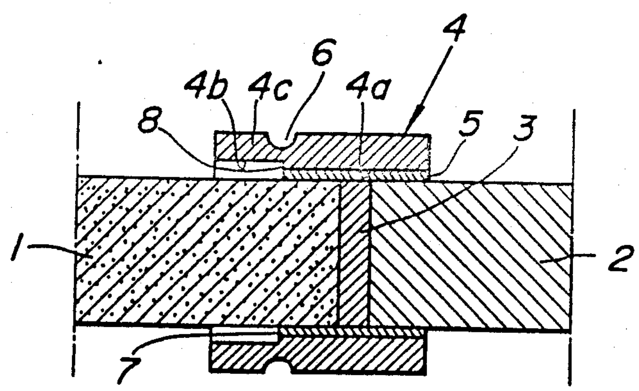
FIG. 1 is a longitudinal sectional view of a ceramic and metal joining structure according to an embodiment of the present invention.
Figure 5:
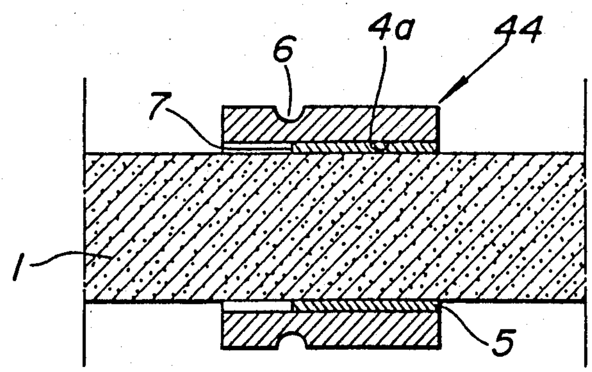
FIG. 5 is a longitudinal sectional view of a further embodiment of the present invention.

FIG. 5 shows a further embodiment of the present invention. This embodiment differs from the previous embodiment of FIG. 1 in that the metal sleeve 44 is adapted to be installed only on the ceramic shaft 1 and that the metal sleeve 44 is not formed with a stepped bore but an inner circumferential wall 44a of a uniform cross section. The inner circumferential wall 44a of the metal sleeve 44 is not joined at its entirety with the ceramic shaft 1 but joined in part with same by brazing with a brazing metal 5 in such a manner that the end 7 of the joint where the metal sleeve 44 is securely joined with the ceramic shaft 1 by brazing with the brazing metal 5 is positioned so as to correspond to the groove 6. This embodiment can produce substantially the same effect when compared with an example which is not provided with the groove 6. In this embodiment, the brazing procedure is performed in such a way that a filler metal 5 in a state of paste is applied on the ceramic shaft 1 and the metal sleeve 44 is such a manner as to be held in place therebetween and then heated in a reducing or protective atmosphere (e.g. in hydroagent of 820° C.) to be molten.

Figure 6:
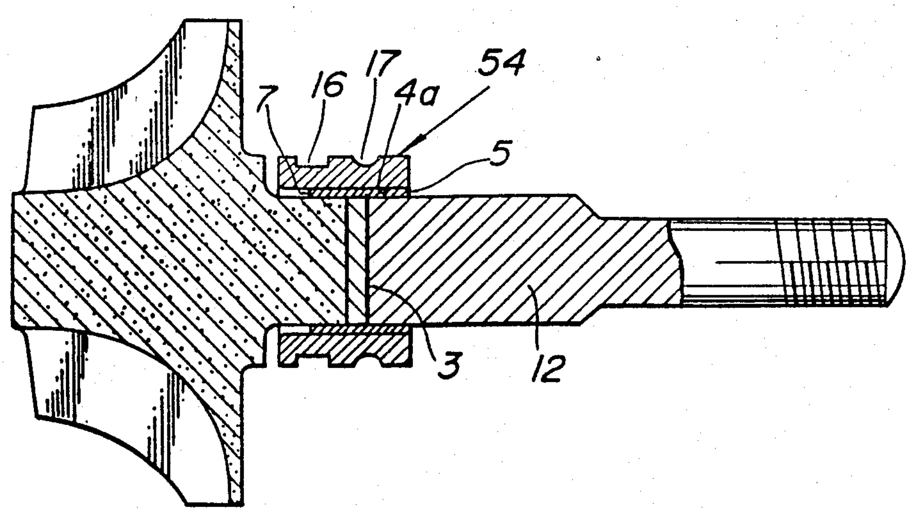
FIG. 6 is a view similar to FIG. 2A but showing a further modification of the present invention.

FIG. 6 shows a still further embodiment of the present invention. In this embodiment, the brazing metal 5 is applied on the metal sleeve 54 and the ceramic and metal shafts 11a and 12 in such a way that the brazing or joining area extends, with respect to the axial direction of the metal sleeve 54, from the place corresponding to the groove 16 to the position coinciding with an axial end of the metal sleeve 54 on the metal shaft side. In this embodiment, the metal sleeve 54 is made of a high strength material of Fe-Ni-Co alloy while an Ag-Ni-Cu alloy having a good heat resisting property is used for the brazing filler metal 5. The buffer member 3 is tow-layered to include a layer made of at least one kind of low expansion metal and a layer made of at least one kind of low Young's modulus alloy. The above mentioned low expansion metal is desirable to be a W-Ni alloy, W-Cu alloy, W-Cu-Ni alloy, W-Ni-Fe alloy, W-Ni-Fe-Cr alloy or the like metal that mainly contains W (tungsten) and Mo (molybdenum). The low Young's modulus alloy is desirable to be Cu, Ag, Ni, Fe-Ni alloy (42% Ni), SUS403, etc. The overall thickness of the buffer member 3 is designed to be 0.04–0.4 times as large as the largest width of the joining surfaces (i.e. the diameter of the ceramic or metal shaft in this embodiment). This embodiment can produce substantially the same effect as the embodiment of FIGS. 2A and 2B.

Figure 7:
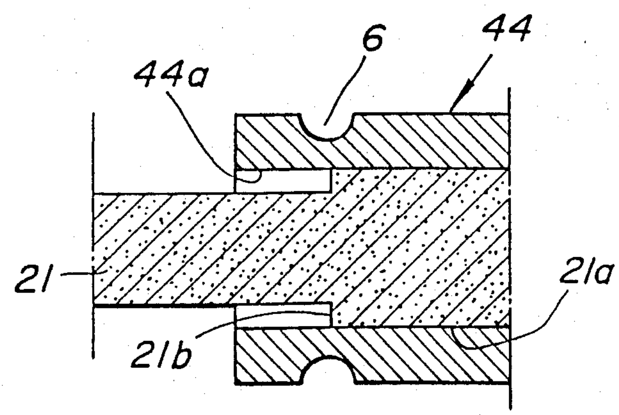
FIGS. 7 and 8 are longitudinal sectional views of further embodiments of the present invention.
Figure 8:
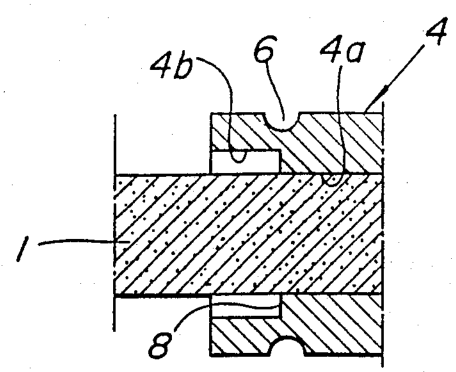
Figure 9:
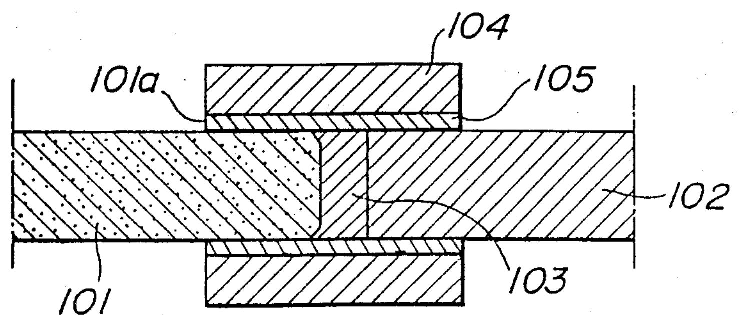
FIG. 9 is a longitudinal sectional view of a prior art ceramic and metal joining structure.

While the present invention has been described and shown in the above, it is not limitative. For example, as shown in FIG. 7, the ceramic shaft 21 may be formed with an increased diameter end portion 21a while the metal sleeve 44 is of the kind having the inner circumferential wall 44a of a uniform cross section. The ceramic shaft 21 is joined at the increased diameter end portion 21a with the inner circumferential wall 44a of the metal sleeve 44. The groove 6 is formed in the outer periphery of the metal sleeve 44 and arranged in the place corresponding to a shoulder 21b at the inner termination of the increased diameter end portion 21a. Further, as shown in FIG. 8, the metal sleeve 4 may be attached to the ceramic shaft 1 by shrink fit.

What is claimed is:

1. A ceramic and metal sleeve assembly comprising:

a ceramic shaft;

a metal sleeve installed on said ceramic shaft and having inner and outer circumferential walls and an annular groove in said outer circumferential wall at a predetermined axial position with respect to one axial end of said ceramic shaft; and means for securely joining part of said inner circumferential wall of said metal sleeve to said ceramic shaft, including a joint disposed between said ceramic shaft and said metal sleeve and axially positioned in such a manner that an axial end of the joint, where said inner circumferential wall of said metal sleeve is securely joined to said ceramic shaft, is positioned between opposite axial ends of said metal sleeve and between opposite axial ends of said ceramic shaft at a position which substantially corresponds with the axial position of said annular groove, wherein a space is defined between said axial end of said joint and one of said axial ends of said metal sleeve and being open to ambient atmosphere surrounding said metal sleeve.

2. A ceramic and metal sleeve assembly as set forth in claim 1, further comprising a metal shaft joined at one axial end with said one axial end of said ceramic shaft and a buffer member interposed between said axial ends of said ceramic and metal shafts, said axial ends of said ceramic and metal shafts and said buffer member being joined together with said metal sleeve.

3. A ceramic and metal sleeve assembly as set forth in claim 2 wherein said joint comprises a brazing metal with which said inner circumferential wall of said metal sleeve is joined with said ceramic and metal shafts by brazing.

4. A ceramic and metal sleeve assembly as set forth in claim 3 wherein said joined end of said ceramic and metal shafts and said buffer member are joined together by brazing.

5. A ceramic and metal sleeve assembly as set forth in claim 4 wherein said inner circumferential wall of said metal sleeve forms a stepped bore including a smaller diameter bore portion, a larger diameter bore portion and a shoulder between said smaller and larger diameter bore portions, said metal sleeve being joined at said smaller diameter bore portion with said ceramic and metal shafts in such a manner that said shoulder is in the place corresponding to said groove with respect to the axial direction of said metal sleeve.

6. A ceramic and metal sleeve assembly as set forth in claim 4 wherein said inner circumferential wall of said metal sleeve forms a bore of uniform cross section, said brazing metal being applied on said inner circumferential wall of said metal sleeve in such a manner as to extend from one of said opposite axial ends of said metal sleeve to the place corresponding to said groove with respect to the axial direction of said metal sleeve.

7. A ceramic and metal sleeve assembly as set forth in claim 4 wherein said inner circumferential wall of said metal sleeve forms a bore of uniform cross section, said ceramic shaft being formed with an increased diameter end portion, a decreased diameter portion abutting said increased diameter end portion and a shoulder formed by the abutment of said increased and decreased diameter portions, said ceramic shaft being joined at said increased diameter end with said inner circumferential wall of said metal sleeve in such a manner that said shoulder is in the place corresponding to said grove with respect to the axial direction of said metal sleeve.

8. A ceramic and metal sleeve assembly as set forth in claim 4 wherein said ceramic shaft is formed integral with a ceramic turbine wheel so that said ceramic and metal shafts constitute part of a turbine rotor of a turbocharger for use in an automotive vehicle.

9. A ceramic and metal sleeve assembly as set forth in claim 8 wherein said groove constitutes an oil seal groove, said outer circumferential wall of said metal sleeve being further formed with a slinger groove in the place nearer to said metal shaft than said oil seal groove.

10. A ceramic and metal sleeve assembly as set forth in claim 8 wherein said groove constitutes a slinger groove, said outer circumferential wall of said metal sleeve being further formed with an oil seal groove in the place nearer to said ceramic shaft than said slinger groove.

11. Means for reducing compressive forces on a ceramic shaft which are induced during the process of installing a metal sleeve having an outer circumferential wall on a ceramic shaft to prevent relative movement of the sleeve and the shaft, the metal sleeve and the ceramic shaft in contact with an intermediate means disposed therebetween, the intermediate means having a first terminal end positioned between opposite axial ends of the metal sleeve and between opposite axial ends of the ceramic shaft, comprising:

an annular groove formed in the outer circumferential wall of the metal sleeve at an axial location which is radially outwardly over the axial location of the first terminal end of the intermediate means, wherein a space is defined between said first terminal end of said intermediate means and one of said axial ends of said metal sleeve and being open to ambient atmosphere surrounding said metal sleeve.

12. Means for reducing compressive forces on a ceramic shaft as claimed in claim 11 wherein said intermediate means comprises a brazing metal.

13. Means for reducing thermal stresses and compressive forces on a ceramic shaft having a metal sleeve installed thereon, the metal sleeve having a first bore portion having an inner circumferential surface in contact along a radial direction and through an intermediate means with the ceramic shaft, the intermediate means having a first terminal end positioned between opposite axial ends of the ceramic shaft and between opposite axial ends of the metal sleeve, comprising:

an annular groove formed in the outer circumferential wall of the metal sleeve at an axial location which substantially corresponds with the axial location of the first terminal end of the intermediate means; and a second bore portion terminating at a free end and integral with the first bore portion of the metal sleeve, said second bore portion having an inner circumferential surface which is spaced from and forms a gap in the direction with the ceramic shaft so that heat from the metal sleeve is dissipated by said second bore portion and is not directly transmitted to the ceramic shaft.

14. Means for reducing thermal stresses and compressive forces in a ceramic shaft as claimed in claim 13 wherein the intermediate means is a brazing metal.

15. Means for reducing thermal stresses and compressive forces in a ceramic shaft as claimed in claim 13 wherein the first bore portion and said second bore portion form a shoulder and said shoulder is axially positioned at a position substantially corresponding with said axial location of said annular groove.

16. Means for reducing thermal stress in a ceramic shaft which is induced during the process of installing a metal sleeve on a ceramic shaft so as to prevent relative movement of the sleeve and the shaft, the metal sleeve having a first bore portion having an inner circumferential surface in contact along a radial direction directly or through an intermediate means with the ceramic shaft, comprising:

a second bore portion terminating at a free end and integral with the first bore portion of said metal sleeve, wherein the first bore portion and said second bore portion form a stepped bore, said second bore portion having an inner circumferential surface which is spaced from and forms a gap in the radial direction with the ceramic shaft so that heat from the metal sleeve is dissipated by said second bore portion and is not directly transmitted to the ceramic shaft, further comprising an annular groove in the outer surface of said metal sleeve positioned at the approximate axial location of said stepped bore.

17. A ceramic and metal sleeve assembly comprising:

a ceramic shaft;

a metal sleeve installed on said ceramic shaft and having inner and outer circumferential walls;

said inner circumferential wall of said metal sleeve forming a stepped bore including a smaller diameter bore portion, a larger diameter bore portion terminating at a free end thereof and a shoulder between said smaller and larger diameter bore portions;

said outer circumferential wall of said metal sleeve being formed with an annular groove substantially coinciding in position with said shoulder with respect to the axial direction of said metal sleeve; and means for securely joining said inner circumferential wall of said metal sleeve to said ceramic shaft in such a way that a joint is disposed only between said inner bore portion of said metal sleeve and said ceramic shaft.

18. A ceramic and metal sleeve assembly as claimed in claim 1, wherein said annular groove is positioned radially outwardly over said joint.

* * * * *